United States Patent
Wu

(10) Patent No.: US 9,268,396 B2
(45) Date of Patent: Feb. 23, 2016

(54) EXPANSION CIRCUIT FOR SERVER SYSTEM AND SERVER SYSTEM USING SAME

(71) Applicant: ScienBiziP Consulting (Shen Zhen) Co., Ltd., Shenzhen (CN)

(72) Inventor: Kang Wu, Shenzhen (CN)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 322 days.

(21) Appl. No.: 13/934,260

(22) Filed: Jul. 3, 2013

(65) Prior Publication Data

US 2014/0040644 A1  Feb. 6, 2014

(30) Foreign Application Priority Data

Jul. 5, 2012  (CN) .......................... 2012 1 0231370

(51) Int. Cl.
*G06F 1/00* (2006.01)
*G06F 1/32* (2006.01)

(52) U.S. Cl.
CPC ............ *G06F 1/3287* (2013.01); *G06F 1/3278* (2013.01); *Y02B 60/126* (2013.01); *Y02B 60/1282* (2013.01)

(58) Field of Classification Search
CPC .............................. A01B 12/006; G06F 32/78
See application file for complete search history.

(56) References Cited

U.S. PATENT DOCUMENTS

| | | | | |
|---|---|---|---|---|
| 7,260,729 B2* | 8/2007 | Araki | .................... | G06F 1/3203 713/300 |
| 8,458,421 B2* | 6/2013 | Eguchi | .................. | G06F 3/0608 711/161 |
| 2002/0040405 A1* | 4/2002 | Gold | ................. | G06F 17/30067 709/231 |
| 2008/0072090 A1* | 3/2008 | O'Connor | ............. | G06F 1/3203 713/330 |
| 2009/0083558 A1* | 3/2009 | Sugiki | ................... | G06F 1/3203 713/320 |
| 2011/0119597 A1* | 5/2011 | Yellamraju | ............... | G06F 3/01 715/753 |
| 2011/0225379 A1* | 9/2011 | Eguchi | .................. | G06F 3/0608 711/162 |

* cited by examiner

*Primary Examiner* — Mohammed Rehman
(74) *Attorney, Agent, or Firm* — Novak Druce Connolly Bove + Quigg LLP

(57) ABSTRACT

An expansion circuit for a server system includes a first output terminal, a second output terminal, a switch circuit and a detection circuit. The first output terminal receives a first voltage and providing the first voltage to a first hard disk drive group. The second output terminal receives the first voltage and provides the first voltage to a second hard disk drive group. The switch circuit is connected between the first and the second output terminals. The detection circuit detects a number of the at least one server which is electrically connected to the expansion circuit. When two servers are electrically connected to the expansion circuit, the detection circuit switches off the switch circuit. When a server is electrically connected to the expansion circuit, the detection circuit switches on the switch circuit.

20 Claims, 3 Drawing Sheets

EXPANSION CIRCUIT FOR SERVER SYSTEM AND SERVER SYSTEM USING SAME

CROSS-REFERENCE TO RELATED APPLICATIONS

This application is related to an U.S. patent application Ser. No. 13/934258 entitled "EXPANSION CIRCUIT FOR SERVER SYSTEM AND SERVER SYSTEM USING SAME", and also claims a foreign priority application filed in China as Serial No. 201210231370.7 on Jul. 5, 2012. These related applications are incorporated herein by reference.

BACKGROUND

1. Technical Field

The present disclosure relates to an expansion circuit for a server system and a server system using the same.

2. Description of Related Art

In a server system, servers are usually placed in an enclosure and configured to control hard disk drives. Generally, one server controls corresponding one hard disk drive group. However, when a number of the severs is less than a number of the hard disk drive groups, one or more hard disk drive groups cannot be used, causing a waste of resources.

What is needed is to provide a means that can overcome the above-described limitations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe certain exemplary embodiments of the present disclosure in detail.

Figure 1:
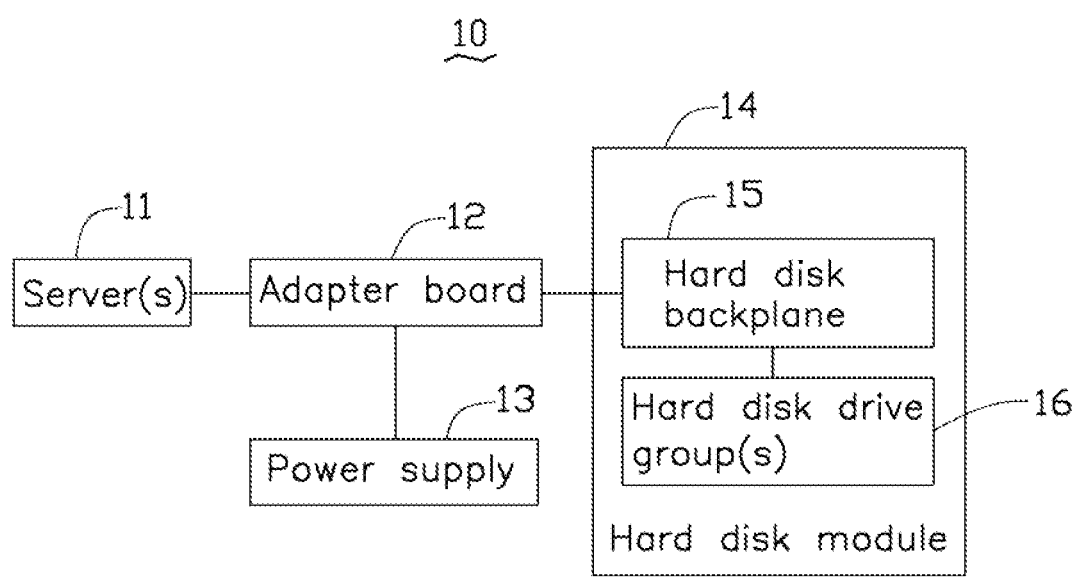
FIG. 1 is a block diagram of a sever system according to a first embodiment of present disclosure.

Referring to FIG. 1, a server system 10 includes at least one server 11, an adapter board 12, a power supply 13, and a hard disk module 14. The hard disk module 14 includes a hard disk backplane 15 and at least one hard disk drive group 16. The server 11, the adapter board 12, the power supply 13, and the hard disk module 14 are placed in an enclosure of the server system 10. The at least one server 11 is electronically coupled to the hard disk drive group 16 via the adapter board 12 and the hard disk backplane 14 sequentially to control the at least one hard disk drive group 16. The power supply 13 is electronically coupled to the adapter board 12 to supply power to the at least one server 11 and the adapter board 12.

Figure 2:
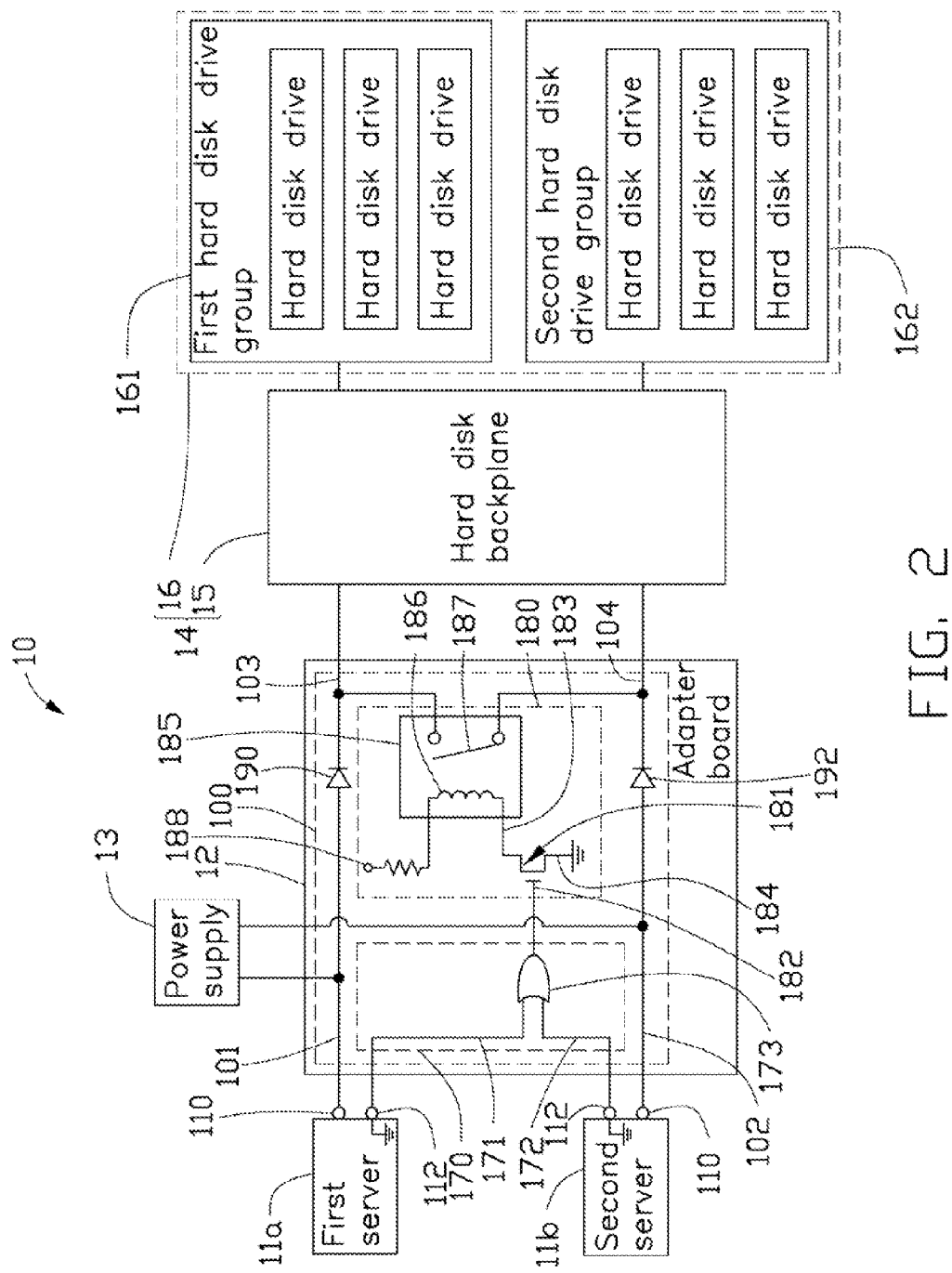
FIG. 2 is a circuit diagram of the sever system of FIG 1.

Referring to FIG 2, the at least one sever 11 may include a first server 11a, a second server 11b, and the at least one hard disk drive group 16 may include a first hard disk drive group 161 and a second hard disk drive group 162. The adapter board 12 includes an expansion circuit 100 to supply power to the first hard disk drive group 161 and the second hard disk drive group 162 via the hard disk backplane 15.

Each of the first server 11a includes a power terminal 110 and a control terminal 112. The expansion circuit 100 includes a first input terminal 101, a first output terminal 103, a second input terminal 102, a second output terminal 104, a detection circuit 170, a switch circuit 180, a first diode 190 and a second diode 192. The first input, terminal 101 is electrically coupled to the power terminal 110 of the first server 11a and the power supply 13. The second input terminal 102 is electrically coupled to the power terminal 110 of the second server 11b and the power supply 13. An anode of the first diode 190 is electrically coupled to the first input terminal 101, and an cathode of the first diode 190 is electrically coupled to the first output terminal 103. An anode of the second diode 192 is electrically coupled to the second input terminal 102, and an cathode of the second diode is electrically coupled to the second output terminal 104.

The detection circuit 170 detects a number of the at least one server 11 which is electrically connected to the expansion circuit 100 and switches on or switches off the switch circuit 180 according to the detection. The detection circuit 170 includes a first detection terminal 171, a second detection terminal 172, and a control circuit 173. The first detection terminal 171 is electrically coupled to the control terminal 112 of the first server 11a. The second detection terminal 172 is electrically coupled to the control terminal 112 of the second server 11b. When the control terminal 112 of the first server 11a is electrically connected to the first detection terminal 171, the first detection terminal 171 receives a first control voltage. When the control terminal 112 of the second server 11b is electrically connected to the second detection terminal 172, the second detection terminal 172 receives a second control voltage. The control circuit 173 receives the first control voltage from the first detection terminal 171 and the second control voltage from the second detection terminal 17.2 and switches on or switches off the switch circuit 180 according to the first and the second control voltages.

In one embodiment, the control circuit 173 is an OR gate having two input terminals and an output terminal. The two input terminal of the control circuit 170 are electrically connected to the first and the second detection terminals 171 and 172 respectively, and the output terminal of the control circuit 170 is configured to output a third control voltage to the switch circuit 180.

The switch circuit 190 includes a voltage input terminal 188, a switch element 181 and a relay 185. The relay 185 includes a control coil 186 and a normally open contact 187. The switch 181 includes a control terminal 182, a first connection terminal 183 and a second connection terminal 184. The control terminal 182 of the switch 181 is connected to the output terminal of the control circuit 170. The voltage input terminal 188 receives a third voltage from the power supply 13 and is grounded via control coil 186, the first connection terminal 183 and the second connection terminal 184. The normally open contact 187 is connected between the first output terminal 103 and the second output terminal 104. The third voltage may be 3.3 volts, in an example.

When the first server 11a and the second server 11b are electrically connected to the expansion circuit and corresponds to the first hard disk drive group and the second hard disk drive group respectively, the expansion circuit 100 provides the first voltage to the first server 11a to supply power to the first server 11a and provides the second voltage to the second server 11b to supply power to the second server 11a. Both the control terminals 112 of the first server 11a and the second server 11b are grounded and obtain a grounded voltage which is low-level voltage. The grounded voltages of the control terminals 112 are served as the first control voltage and the second control voltage and provided to the control circuit 173 of the detection circuit 170, and then the control circuit 173 outputs a low-lever voltage which is served as the third control voltage to the switch circuit 180. The switch circuit 180 is switched off by the controls of the third control voltage, and the normally open contact 187 is open. Accordingly, the first and the second output terminals 103 and 104 are disconnected from each other, the first output terminal 103 provides the first voltage to the first hard disk drive group 161 via the hard disk backplane 15, and the second output terminal 104 provides the second voltage to the second hard disk drive group 162 via the hard disk backplane 15.

When only one server (the first server 11a or the second server 11b) is electrically connected to the expansion circuit 100 and corresponds to the first hard disk drive group 161 and the second hard disk drive group 162, the expansion circuit 100 provides the first voltage to the server. One control terminal 112 of the first server 11a and the second server 11b is grounded to obtain a grounded voltage, and the other one control terminal 112 of the first server 11a and the second server 11b is floating to obtain a high-level voltage (e.g., logic 1). The grounded voltage and the high-level voltage of the control terminals 112 are served as the first control voltage and the second control voltage and provided to the control circuit 173 of the detection circuit 170. The control circuit 173 outputs a high-level voltage which is served as the third control voltage to the switch circuit 180. The switch circuit 180 is switched on by the controls of the third control voltage, and the normally open contact 187 is switched on. Accordingly, the first and the second output terminals 103 and 104 are electrically connected to each other, the first output terminal 103 provides a drive voltage (such as the first voltage or the second voltage) to the first hard disk drive group 161 via the hard disk backplane 15, and the second output terminal 104 provides the drive voltage to the second hard disk drive group 162 via the hard disk backplane 15.

In summary, it can be seen that, when the server system 10 just has one sever but has two hard disk drive groups 161 and 162, the first and the second output terminals 103 and 104 are electrically connected to each other and provides the drive voltage to the first and the second hard disk drive groups 161 and 162, such that the one sever can control the two hard disk drive groups 161 and 162, and the problem of resource waste can be improved.

Figure 3:
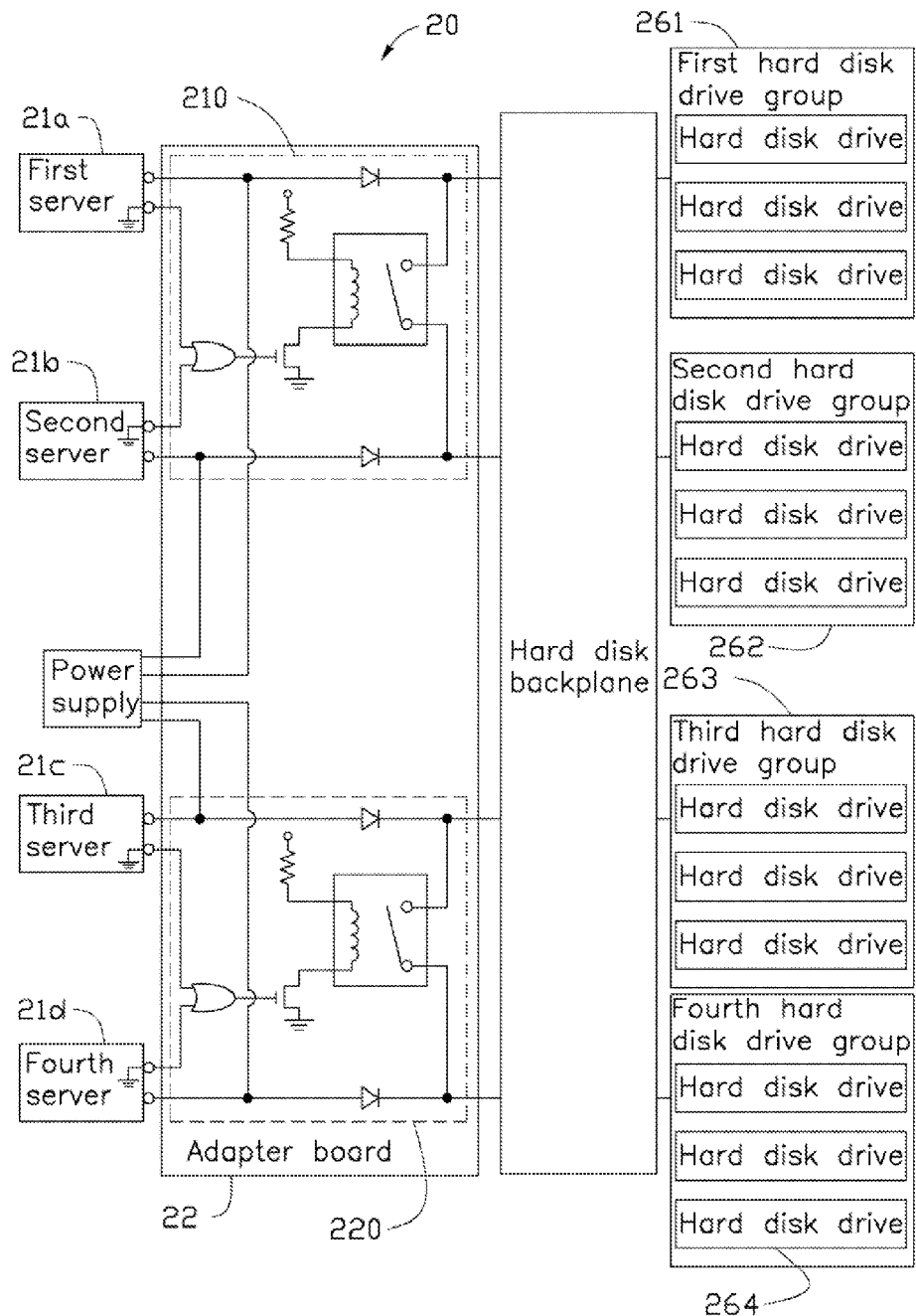
FIG. 3 is a circuit diagram of a server system according to a second embodiment of present disclosure.

Referring to FIG 3, a sever system 20 according to a second embodiment is shown. The sever system 20 is similar to the above-described the sever system 10, differing in that the sever system 20 includes a first server 21a, a second server 21b, a third server 21c, a fourth server 21d, a first expansion circuit 210, a second expansion circuit 220, a first hard disk drive group 261, a second hard disk drive group 262, a third hard disk drive group 263, and a fourth hard disk drive group 264. Both the first expansion circuit 210 and second expansion circuit 220 have the same structure as the power supply circuit 100 in FIG 2. Details of the structure of the first expansion circuit 210 and second expansion circuit 220 are not described here. The first server 21a and the second server 21b are electrically coupled to the first and the second hard disk drive groups 261 and 262 via the first expansion circuit 210. The third server 21c and the fourth server 21d are electrically coupled to the third and the fourth hard disk drive groups 263 and 264 via the second expansion circuit 220. The first expansion circuit 210 and the second expansion circuit 220 are located on the same adapter board 22 of the server system 20.

It is to be further understood that even though numerous characteristics and advantages of preferred and exemplary embodiments have been set out in the foregoing description, together with details of the structures and functions of the embodiments, the disclosure is illustrative only; and that, changes may be made in detail, especially in matters of shape, size and arrangement of parts within the principles of the present disclosure to the full extent indicated by the broad general meaning of the terms in which the appended claims are expressed.

What is claimed is:

1. An expansion circuit connected between at least one server and a hard disk module, comprising:
   a first output terminal receiving a first voltage and providing the first voltage to a first hard disk drive group;
   a second output terminal receiving a second voltage and providing the second voltage to a second hard disk drive group;
   a switch circuit connecting between the first output terminal and the second output terminal; and
   a detection circuit detecting a number of the at least one server electrically connected to the expansion circuit and switching on or switching off the switch circuit according to the detection;
   wherein when two servers are electrically connected to the expansion circuit and corresponds to the first hard disk drive group and the second hard disk drive group respectively, the detection circuit switches off the switch circuit; and when a server is electrically connected to the expansion circuit and corresponds to the first hard disk drive group and the second hard disk drive group, the detection circuit switches on the switch circuit.

2. The expansion circuit of claim 1, wherein the detection circuit comprises a first detection terminal, a second detection terminal, and a control circuit, the first detection terminal is configured to connect a control terminal of a first server of the two severs, the second detection terminal is configured to connect a control terminal of a second server of the two servers, wherein when the control terminal of the first server is electrically connected to the first detection terminal, the first detection terminal receives a first control voltage; when the control terminal of the second server is electrically connected to the second detection terminal, the second detection terminal receives a second control voltage; and the control circuit receives the first control voltage from the first detection terminal and the second control voltage from the second detection terminal and switches on or switches off the switch circuit according to the first and the second control voltages.

3. The expansion circuit of claim 2, wherein both the control terminals of the first and the second servers are a grounded terminal, and both the first control voltage and the second control voltage are a grounded voltage.

4. The expansion circuit of claim 3, wherein the control circuit further comprises an OR gate comprising two input terminals and an output terminal, the two input terminal are electrically connected to the first and the second detection terminals respectively, and the output terminal is configured to output a third control voltage to the switch circuit.

5. The expansion circuit of claim 4, wherein the switch circuit comprises a voltage input terminal, a switch element and a relay, the relay comprises a control coil and a normally open contact, the switch comprises a control terminal, a first connection terminal and a second connection terminal, the control terminal of the switch is connected to the output terminal of the control circuit, the voltage input terminal receives a third voltage and is grounded via control coil, and the first connection terminal and the second connection terminal, the normally open contact is connected between the first output terminal and the second output terminal.

6. The expansion circuit of claim 1, further comprising a first input terminal and a first diode, wherein the first input terminal is configured to receive the first voltage from a power supply, an anode of the first diode is electrically coupled to the first input terminal, and an cathode of the first diode is electrically coupled to the first output terminal.

7. The expansion circuit of claim 6, wherein the first input terminal is further configured to electrically connected to a power terminal of the first server and supply power to the first server.

8. The expansion circuit of claim 6, further comprising a second input terminal and a second diode, wherein the second input terminal is configured to receive the second voltage from the power supply, an anode of the second diode is electrically coupled to the second input terminal, and an cathode of the second diode is electrically coupled to the second output terminal.

9. The expansion circuit of claim 8, wherein the second input terminal is further configured to electrically connected to a power terminal of the second server and supply power to the second server.

10. The expansion circuit of claim 1, wherein the expansion circuit is located at an adapter board connected between the at least one server and a hard disk backplane of the hard disk module.

11. A server system, comprising:
a hard disk module comprising a first hard disk drive group and a second hard disk drive group;
at least one server configured to control the first and the second hard disk drive groups;
a power supply for providing a first voltage; and
an expansion circuit connected between the at least one server and the hard disk module, comprising:
a first output terminal for receiving the first voltage and providing the first voltage to the first hard disk drive group;
a second output terminal for receiving a second voltage and providing the second voltage to the second hard disk drive group;
a switch circuit connecting between the first output terminal and the second output terminal; and
a detection circuit for detecting the number of the at least one server which is electrically connected to the expansion circuit and switching on or switching off the switch circuit according to the detection;
wherein when two servers are electrically connected to the expansion circuit and corresponds to the first hard disk drive group and the second hard disk drive group respectively, the detection circuit switches off the switch circuit; and when a server is electrically connected to the expansion circuit and corresponds to the first hard disk drive group and the second hard disk drive group, the detection circuit switches on the switch circuit.

12. The server system of claim 11, wherein the detection circuit comprises a first detection terminal, a second detection terminal, and a control circuit, the first detection terminal is configured to connect a control terminal of a first server of the two severs, the second detection terminal is configured to connect a control terminal of a second server of the two servers, wherein when the control terminal of the first server is electrically connected to the first detection terminal, the first detection terminal receives a first control voltage; when the control terminal of the second server is electrically connected to the second detection terminal, the second detection terminal receives a second control voltage; and the control circuit receives the first control voltage from the first detection terminal and the second control voltage from the second detection terminal and switches on or switches off the switch circuit according to the first and the second control voltages.

13. The server system of claim 12, wherein both the control terminals of the first and the second servers are a grounded terminal, and both the first control voltage and the second control voltage are a grounded voltage.

14. The server system of claim 13, wherein the control circuit further comprises an OR gate comprising two input terminals and an output terminal, the two input terminal are electrically connected to the first and the second detection terminals respectively, and the output terminal is configured to output a third control voltage to the switch circuit.

15. The expansion circuit of claim 14, wherein the switch circuit comprises a voltage input terminal, a switch element and a relay, the relay comprises a control coil and a normally open contact, the switch comprises a control terminal, a first connection terminal and a second connection terminal, the control terminal of the switch is connected to the output terminal of the control circuit, the voltage input terminal receives a third voltage from the power supply and is grounded via control coil, and the first connection terminal and the second connection terminal, the normally open contact is connected between the first output terminal and the second output terminal.

16. The server system of claim 11, wherein the expansion circuit further comprises a first input terminal and a first diode, the first input terminal is configured to receive the first voltage from the power supply, an anode of the first diode is electrically coupled to the first input terminal, and an cathode of the first diode is electrically coupled to the first output terminal.

17. The server system of claim 16, wherein the expansion circuit further comprises a second input terminal and a second diode, the second input terminal is configured to receive the second voltage from the power supply, an anode of the second diode is electrically coupled to the second input terminal, and an cathode of the second diode is electrically coupled to the second output terminal.

18. The server system of claim 17, wherein the first input terminal is further configured to electrically connected to a power terminal of the first server and supply power to the first server, and the second input terminal is further configured to electrically connected to a power terminal of the second server and supply power to the second server.

19. The server system of claim 11, wherein the hard disk module further comprises a hard disk backplane connected between the expansion circuit and the first and the second hard disk drive groups.

20. The server system of claim 19, wherein the expansion circuit is located at an adapter board connected between the at least one server and the hard disk backplane.

* * * * *